(12) United States Patent
Chien et al.

(10) Patent No.: US 7,327,929 B2
(45) Date of Patent: Feb. 5, 2008

(54) BACKLIGHT MODULE FOR 3D DISPLAY DEVICE AND METHOD FOR DISPLAYING 3D IMAGES UTILIZING THE SAME

(75) Inventors: Ko-Wei Chien, Keelung (TW); Yu-Mioun Chu, Alian Township, Kaohsiung County (TW); Han-Ping Shieh, Hsinchu (TW); Chih-Jen Hu, Hsinchu (TW); Ching-Sang Yang, Bade (TW); Yi-Cheng Hsu, Taipei (TW); Chieh-Ting Chen, Taipei (TW); Chih-Ming Chang, Jhongli (TW); Yung-Lun Lin, Wujie Township, Yilan County (TW); Meng-Chang Tsai, Chiayi (TW); Ching-Huan Lin, Sinying (TW); Mu-Jen Su, Tainan (TW); Hsiu-Chi Tung, Taipei (TW)

(73) Assignee: Au Optronics Corp., Hsinchu (TW)

( * ) Notice: Subject to any disclaimer, the term of this patent is extended or adjusted under 35 U.S.C. 154(b) by 38 days.

(21) Appl. No.: 11/146,659

(22) Filed: Jun. 7, 2005

(65) Prior Publication Data
US 2006/0164862 A1 Jul. 27, 2006

(30) Foreign Application Priority Data
Jan. 24, 2005 (TW) .............................. 94101985 A

(51) Int. Cl.
G02B 6/10 (2006.01)
F21V 8/00 (2006.01)

(52) U.S. Cl. ........................................ 385/146; 362/31
(58) Field of Classification Search ................ 385/133, 385/146
See application file for complete search history.

(56) References Cited

U.S. PATENT DOCUMENTS

| 5,897,184 | A | 4/1999 | Eichenlaub et al. |
| 2001/0024561 | A1* | 9/2001 | Cornelissen et al. ........ 385/146 |
| 2003/0112329 | A1* | 6/2003 | Thomason .................... 348/52 |
| 2003/0210540 | A1* | 11/2003 | Yamada et al. ............... 362/31 |
| 2003/0227768 | A1* | 12/2003 | Hara et al. .................... 362/31 |
| 2006/0146227 | A1* | 7/2006 | Park et al. .................... 349/64 |

FOREIGN PATENT DOCUMENTS

| JP | 2003068122 | 3/2003 |
| JP | 2003149640 | 5/2003 |

OTHER PUBLICATIONS

China Office Action mailed Sep. 29, 2006.

* cited by examiner

Primary Examiner—Tina M. Wong
(74) Attorney, Agent, or Firm—Thomas, Kayden, Horstemeyer & Risley

(57) ABSTRACT

A backlight module including a first light guide plate, a first light source, a second light guide plate, and a second light source. The first light guide plate includes a first side, a second side opposite to the first side, and a first surface with a micro-groove structure. The first light source is disposed on the first side of the first light guide plate. The second light guide plate is disposed on the first light guide plate, and includes a third side, a fourth side opposite to the third side, and a second surface with a micro-groove structure. The fourth side and the second side are located at the same side. The second light source is disposed on the fourth side of the second light guide plate.

31 Claims, 6 Drawing Sheets

BACKLIGHT MODULE FOR 3D DISPLAY DEVICE AND METHOD FOR DISPLAYING 3D IMAGES UTILIZING THE SAME

BACKGROUND

The invention relates to a backlight module, and in particular, to a backlight module for a 3D display device and a method for displaying 3D images.

As color displays gradually replace monochrome displays, 3D displays are expected to be the next trend in the entertainment due to their enhanced image display capability.

Currently, autostereoscopic LCDs which do not require special glasses are under development to enable natural viewing of 3D images. Autostereoscopic LCDs are generally classified into two types: time-multiplexed and spatial multiplexed types. The spatial-multiplexed approach, such as the parallax barrier and the lenticular methods have the disadvantages of resolution of one half or less and brightness degradation compared with the time-multiplexed type due to a set of parallax images being displayed on alternate columns of an LCD.

In view of this, the inventors of this application have provided a 3D display device and method in Taiwan Application No. 93114833. The 3D display device is a time-multiplexed type, and comprises a light guide plate and a focus layer. A micro-groove structure of the light guide plate is different from that of the focus layer. To simplify the structure and fabrication, the inventors provide the following application.

SUMMARY

Backlight modules are provided. An exemplary embodiment of a backlight module comprises a first light guide plate, a second light guide plate, a first light source, and a second light source. The first light guide plate comprises a first side, a second side opposite to the first side, and a first surface with a micro-groove structure. The first light source is disposed on the first side of the first light guide plate. The second light guide plate is disposed on the first light guide plate, and comprises a third side, a fourth side opposite to the third side, and a second surface with a micro-groove structure. The fourth side and the second side are located at the same side. The second light source is disposed on the fourth side of the second light guide plate.

Furthermore, the backlight module comprises a first reflector and a second reflector. The first reflector is disposed on the second side of the first light guide plate. The second reflector is disposed on the third side of the second light guide plate. When the first surface of the first light guide plate is opposite to the second light guide plate, the backlight module further comprises a light absorber disposed adjacent to the first light guide plate. Alternatively, when the first surface of the first light guide plate faces the second surface of the second light guide plate, the backlight module further comprises a third reflector disposed adjacent to the first light guide plate.

Note that the micro-groove structure of the first surface and the micro-groove structure of the second surface are the same. The thickness of the first light guide plate is tapered from the first side to the second side, and the thickness of the second light guide plate is tapered from the fourth side to the third side. Alternatively, both the first and second light guide plates may have a uniform thickness respectively.

Additionally, the micro-groove structure of the first surface comprises a plurality of micro grooves, and the pitch between two adjacent micro grooves is tapered from the first side to the second side. The micro-groove structure of the second surface comprises a plurality of micro grooves, and the pitch between two adjacent micro grooves is tapered from the fourth side to the third side. Each micro groove comprises a first plane and a second plane. An angle formed by the intersection of the first plane and the first or second surface ranges substantially between twenty and sixty degrees.

Additionally, a longitudinal center line of the first light guide plate is tilted with respect to a longitudinal center line of the second light guide plate by a predetermined angle. The predetermined angle is substantially smaller than 15 degrees. The backlight module further comprises a diffuser disposed on the second light guide plate.

Note that both the first and second surfaces may be formed by diamond knife machining, injection molding, or micro-machinery machining.

Displays are provided. An exemplary embodiment of a display comprises the backlight module and a liquid crystal panel disposed on the backlight module.

Note that the first light source and the second light source may be switched on simultaneously to provide a 2D image.

3D display methods are provided. An exemplary embodiment of a method for displaying 3D images by a 3D display device comprises the following steps. The 3D display device comprises a liquid crystal panel and a backlight module. The backlight module comprises a first light source, a second light source, a first light guide plate and a second light guide plate. The first light source and the second light source are switched on alternately. The light emitted by the first light source is totally internal reflected by the first surface of the first light guide plate to pass through a second surface of the second light guide plate and the liquid crystal panel to project into one eye. The light emitted by the second light source is totally internal reflected by the second surface of the second light guide plate to pass through the liquid crystal panel to project into another eye. Thus, a 3D image can be observed by both eyes.

Note that the duration for switching on each of the first light source and the second light source is less than or equal to 0.008 second at a time.

DESCRIPTION OF THE DRAWINGS

The invention can be more fully understood by reading the subsequent detailed description and examples with references made to the accompanying drawings, wherein.

DETAILED DESCRIPTION

Figure 1:
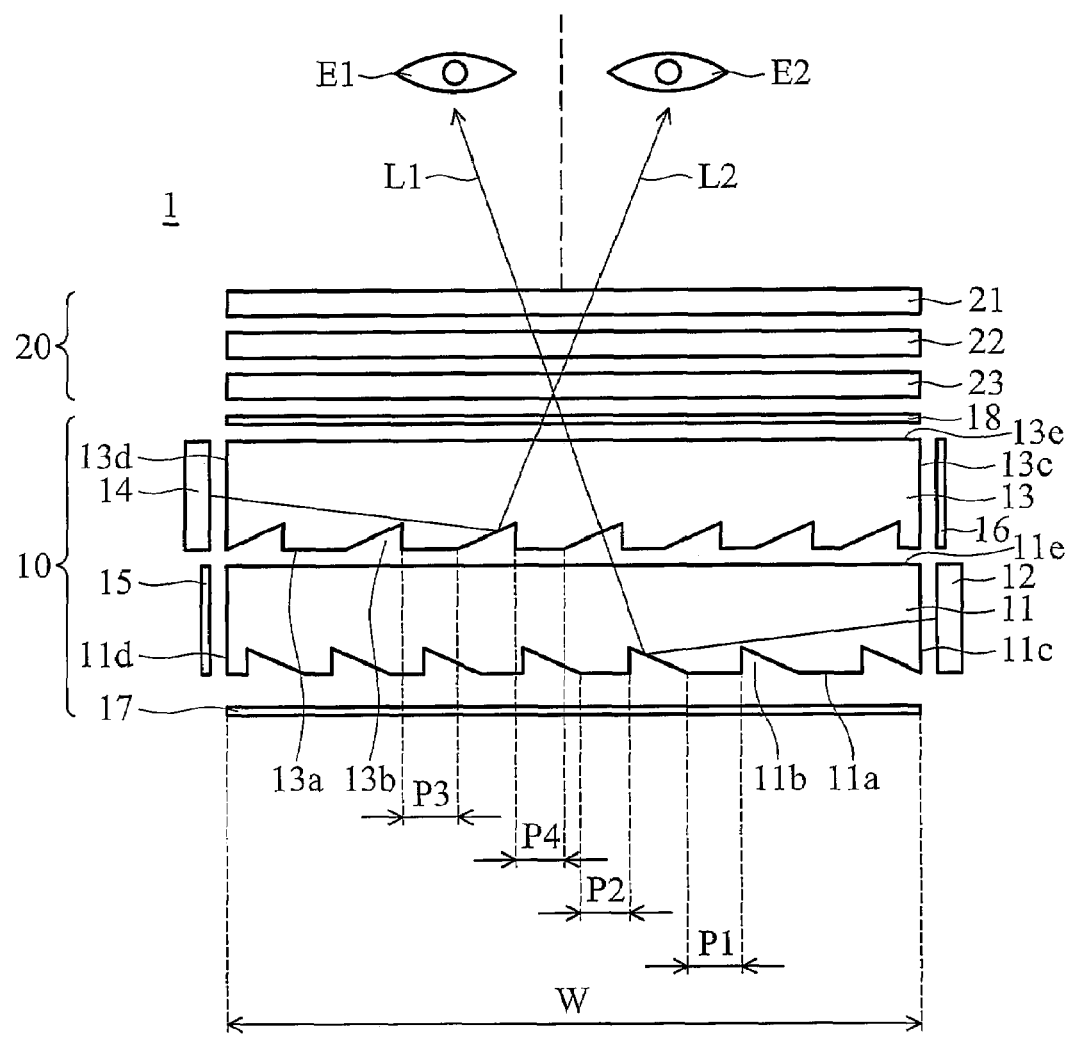
FIG. 1 is a schematic view of an embodiment of a 3D display device.

FIG. 1 depicts an embodiment of a 3D display device 1 comprising a backlight module 10 and a liquid crystal panel

20. The backlight module 10 comprises a first light guide plate 11, a first light source 12, a second light guide plate 13, a second light source 14, a first reflector 15, a second reflector 16, and a light absorber 17.

Figure 2A:
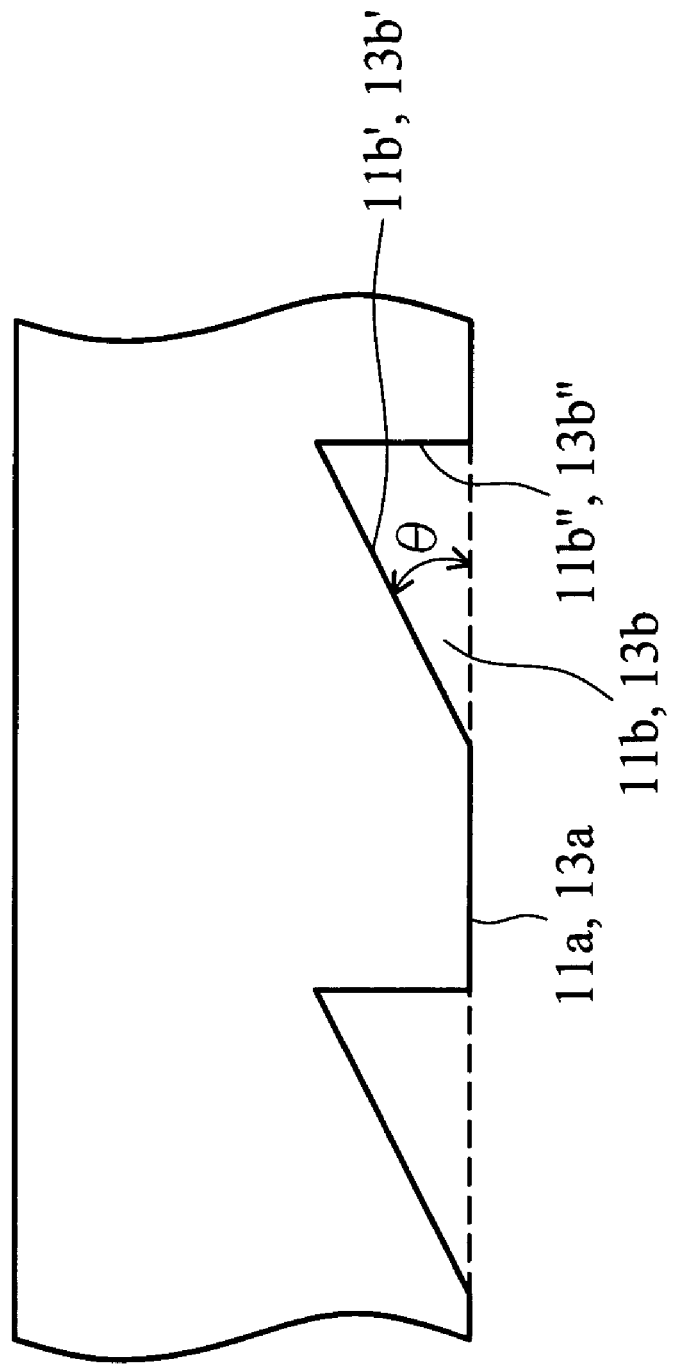
FIG. 2*a* is a partially enlarged view of a first light guide plate and a second light guide plate in FIG. 1.

The first light guide plate 11 comprises a first side 11*c*, a second side 11*d* opposite to the first side 11*c*, a first surface 11*a* with a micro-groove structure, and a first face 11*e* opposite to the first surface 11*a*. The first surface 11*a* is a bottom surface of the first light guide plate 11, and comprises a plurality of micro grooves 11*b*. The first surface 11*a* of the first light guide plate 11 is opposite to the second light guide plate 13. As shown in FIG. 2*a*, each micro groove 11*b* comprises a first plane 11*b*' and a second plane 11*b*". An angle (θ) formed by the intersection of the first plane 11*b*' and the first surface 11*a* is substantially thirty-eight degrees. Additionally, referring to FIG. 1, the pitch between two adjacent micro grooves 11*b* is tapered from the first side 11*c* to the second side 11*d* (P1>P2). That is, the first surface 11*a* comprises a non-uniform pitch.

Specifically, when the width of the light guide area of the first light guide plate 11 is about 30.4 mm and the width of the micro groove 11*b* is preset at about 25 μm, the pitch between two adjacent micro grooves 11*b* can be obtained by software as follows.

$$f(y)=-0.0004y^2-0.0002y+0.393 \text{ (unit:mm)}$$

f(y) represents the pitch between the two adjacent micro grooves 11*b*. y is a distance away from a boundary, near the first side 11*c*, of the light guide area of the first light guide plate 11.

In practice, the width of the micro groove 11*b* may be adjusted in different cases to meet the light uniformity requirement. Furthermore, the angle formed by the intersection of the first plane 11*b*' and the first surface 11*a* may range between twenty and sixty degrees based on requirements.

The first light source 12 is disposed on the first side 11*c* of the first light guide plate 11 to emit a first light L1. The second light guide plate 13 is disposed on the first light guide plate 11, and comprises a third side 13*c*, a fourth side 13*d* opposite to the third side 13*c*, a second surface 13*a* with a micro-groove structure, and a second face 13*e* opposite to the second surface 13*a*. The fourth side 13*d* and the second side 11*d* are located at the same side. The second surface 13*a* is a bottom surface of the second light guide plate 13, and comprises a plurality of micro grooves 13*b*. Since the micro-groove structure of the second surface 13*a* and the micro-groove structure of the first surface 11*a* are the same, its detailed description is omitted here. Note that the pitch between two adjacent micro grooves 13*b* is tapered from the fourth side 13*d* to the third side 13*c* (as shown in FIG. 1, P3>P4).

Additionally, the thickness of the first light guide plate 11 may be tapered from the first side 11*c* to the second side 11*d*, and the thickness of the second light guide plate 13 may be tapered from the fourth side 13*d* to the third side 13*c*, thus enhancing projection of the light. Alternatively, both the first and second light guide plates 11 and 13 may have a uniform thickness respectively.

The second light source 14 is disposed on the fourth side 13*d* of the second light guide plate 13 to emit a second light L2. The first reflector 15 is disposed on the second side 11*d* of the first light guide plate 11 to reflect the light from the second side 11*d* of the first light guide plate 11 back to the first light guide plate 11. The second reflector 16 is disposed on the third side 13*c* of the second light guide plate 13 to reflect the light from the third side 13*c* of the second light guide plate 13 back to the second light guide plate 13. Thus, the light utilization efficiency of the first and second light sources 12 and 14 may be enhanced. The light absorber 17 is disposed beneath the first light guide plate 11 to face the first surface 11*a*. The light absorber 17 may be a blackbody absorbing light from the bottom surface of the first light guide plate 11 to avoid affecting light projection.

Note that the backlight module 10 may further comprise a diffuser 18 disposed on the second light guide plate 13 to remove moiré pattern that may be generated. The diffusion coefficient of the diffuser 18 may range between twenty-five and forty preferably. Additionally, the moiré pattern may be removed by other means. For example, a longitudinal center line of the first light guide plate is tilted with respect to a longitudinal center line of the second light guide plate by a predetermined angle that is substantially smaller than fifteen degrees. That is, the first light guide plate 11 may rotate with respect to the second light guide plate 13 during assembly.

Figure 2B:
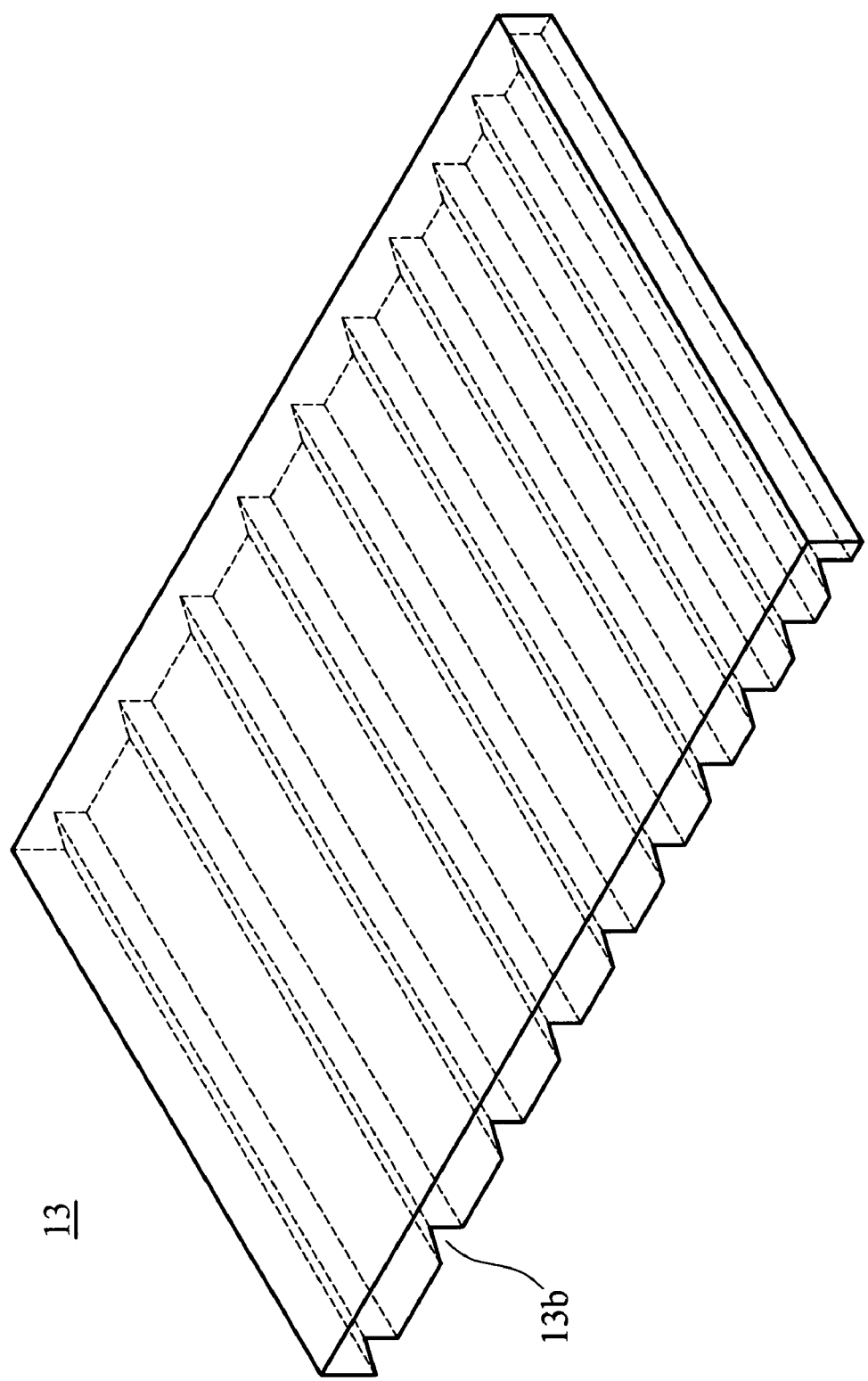
FIG. 2*b* is a perspective view of the second light guide plate.
Figure 2C:
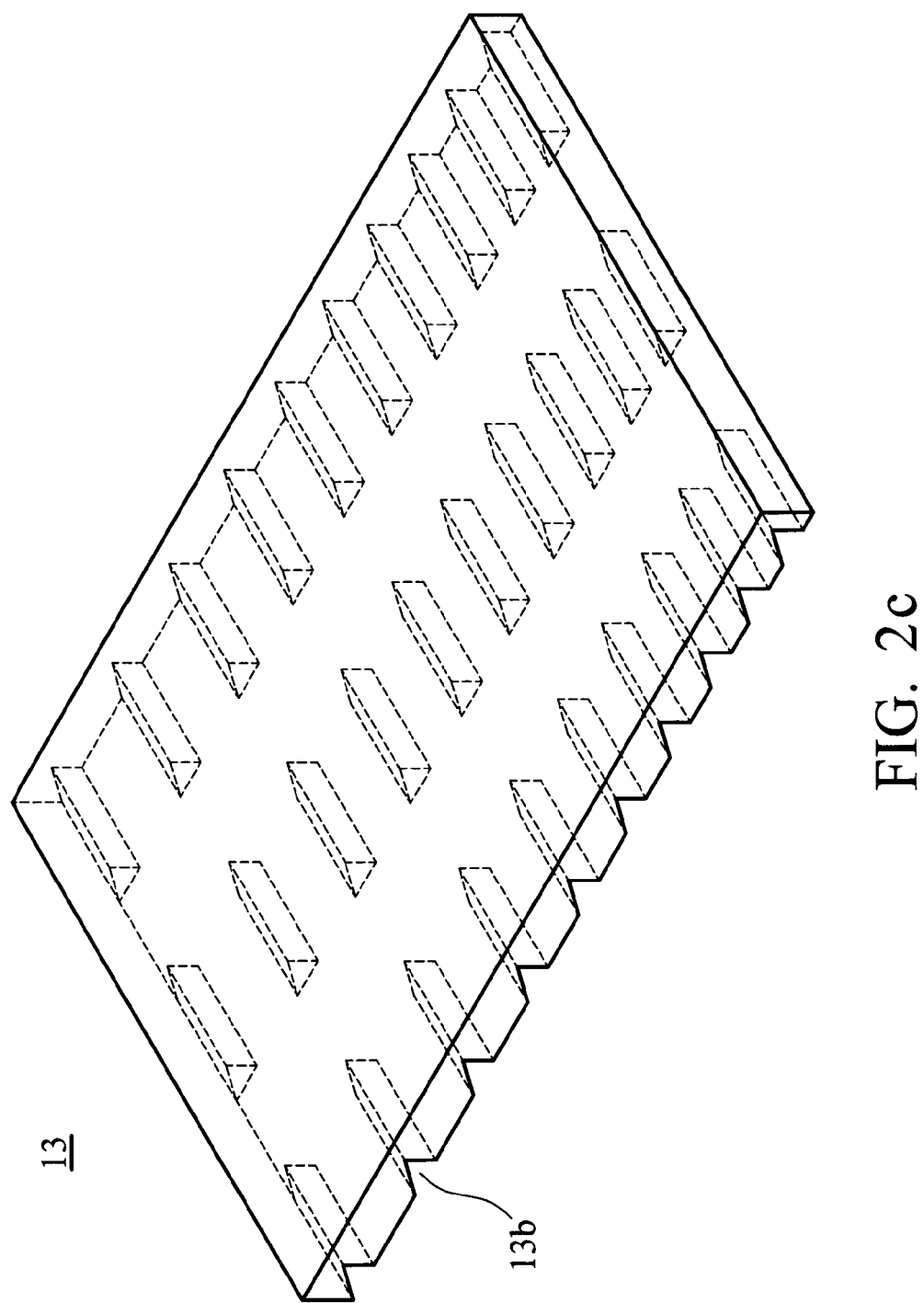
FIG. 2*c* is a perspective view of a variant embodiment of a second light guide plate.

Additionally, as shown in FIG. 2*b*, since the periodic micro grooves 11*b* and 13*b* of the first and second light guide plates 11 and 13 are overlapped, the backlight module may generate a moiré pattern. In view of this, the micro grooves 11*b* and 13*b* of the first and second light guide plates 11 and 13 may be discontinuous as shown in FIG. 2*c*, thus preventing moiré pattern generation. As a result, an additional diffuser is not required, and rotation of the first light guide plate with respect to the second light guide plate is not required.

Note that both the first and second surfaces 11*a* and 13*a* may be formed by diamond knife machining, injection molding, or micro-machinery machining.

The liquid crystal panel 20 is disposed on the backlight module 10, and comprises an upper glass surface 21, a liquid crystal layer 22, and a lower glass surface 23. The liquid crystal layer 22 can correspond to quick switching between the first and second light sources 12 and 14, such as twisted nematic (TN) or optically compensated bend (OCB) modes.

Note that the 3D display device 1 may be a liquid crystal display.

Figure 3:
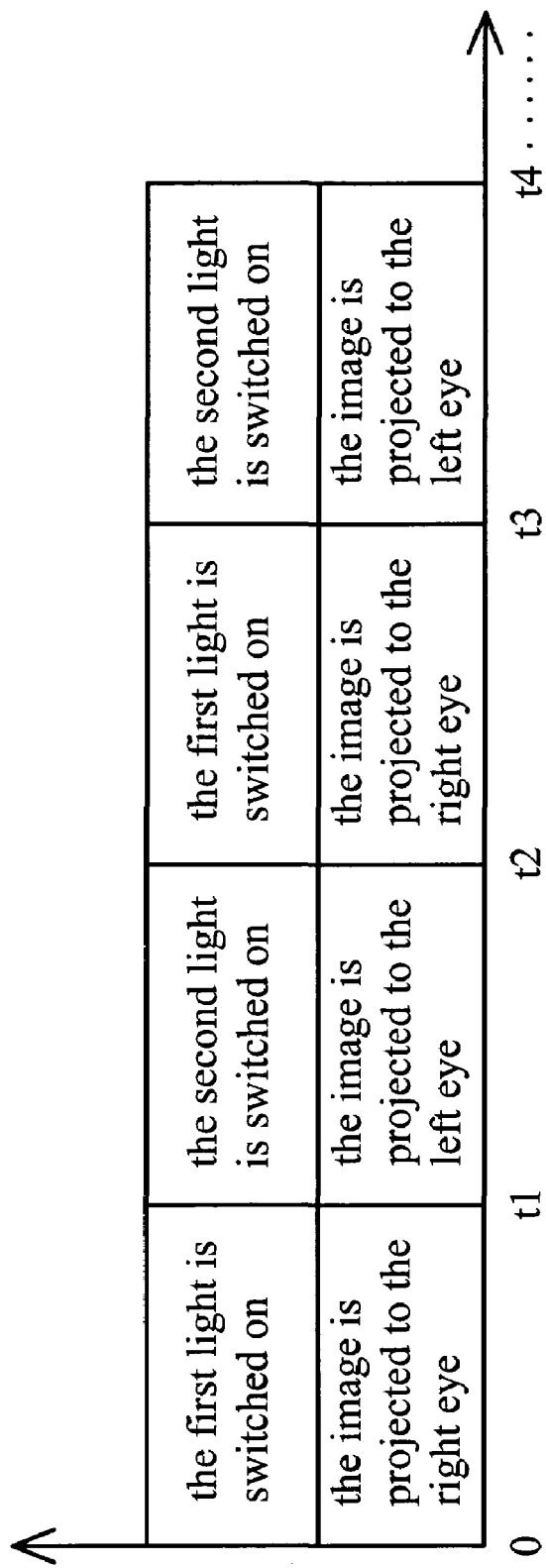
FIG. 3 is a schematic view of an embodiment of a 3D display method.

An exemplary embodiment of a 3D display method comprises the following steps. The 3D display device 1 in FIG. 1 is provided. To project a 3D image at the eyes of a viewer, the first light source 12 and the second light source 14 are switched on alternately to emit the light L1 and L2. Most of the light L1 is totally internal reflected by the micro grooves 11*b* of the first surface 11*a* of the first light guide plate 11 to pass through the second surface 13*a* of the second light guide plate 13 and the liquid crystal panel 20 to project onto the right eye E1 of the viewer. Most of the light L2 is totally internal reflected by the micro grooves 13*b* of the second surface 13*a* of the second light guide plate 13 to pass through the liquid crystal panel 20 to project onto the left eye E2 of the viewer. That is, as shown in FIG. 3, when the first light source 12 is switched on during a first period (0-t1), the right-eye image is projected to the right eye E1. When the second light source 14 is switched on during a second period (t1-t2), the left-eye image is projected to the left eye E2. By switching the first and second light sources 12 and 14 sequentially, the 3D image is obtained in the eyes of a viewer.

Note that the duration for switching on each of the first light source 12 and the second light source 14 is less than or equal to 0.008 second at a time.

Additionally, the first light source 12 and the second light source 14 may be turned on simultaneously to provide a 2D image.

As previously described, the 3D display may be obtained by an embodiment of the backlight module in combination with fast switching liquid crystal. Compared with other 3D technologies based on spatial multiplexed methods, the benefits of an embodiment of the 3D display device are higher light efficiency without compromising resolution. Furthermore, since the micro-groove structure of the second surface 13a and the micro-groove structure of the first surface 11a are the same, the structure of the backlight module 10 is simple and no alignment issue exists.

Figure 4:
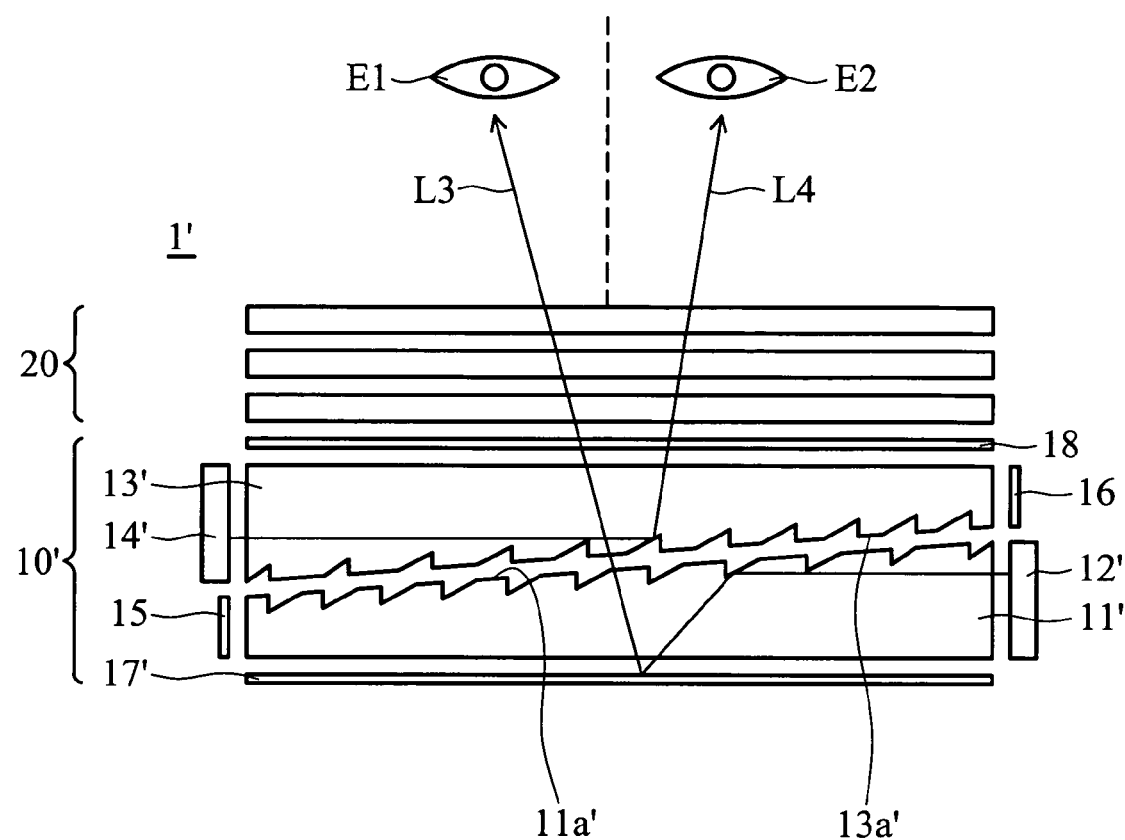
FIG. 4 is a schematic view of another embodiment of a 3D display device.

FIG. 4 depicts another embodiment of a 3D display device 1'. The 3D display 1' differs from the 3D display 1 in that the first surface 11a' of the first light guide plate 11' of the 3D display device 1' faces the second surface 13a' of the second light guide plate 13' of the 3D display device 1'. Furthermore, the backlight module 10' of the 3D display device 1' further comprises a third reflector 17' to replace the light absorber 17 of the backlight module 10. The third reflector 17' is disposed beneath the first light guide plate 11' to reflect the light from the bottom surface of the first light guide plate 11' back to the first light guide plate 11'.

Comparing FIG. 4 with FIG. 1, the proceeding direction of the light L4 from the second light source 14' of the backlight module 10' is the same as that of the light L2 from the second light source 14 of the backlight module 10. Nevertheless, the proceeding direction of the light L3 from the first light source 12' of the backlight module 10' is different from that of the light L1 from the first light source 12 of the backlight module 10. Specifically, the light L3 is totally internal reflected by the first surface 11a' of the first light guide plate 11' to be reflected by the third reflector 17' to project into the right eye E1 of the viewer.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A backlight module for a 3D display device, comprising:
    a first light guide plate having a first side, a second side opposite to the first side, and a first surface with a micro-groove structure;
    a first light source disposed on the first side of the first light guide plate;
    a second light guide plate, separately disposed over the first light guide plate, having a third side, a fourth side opposite to the third side, and a second surface with a micro-groove structure, wherein the fourth side and the second side are located at the same side; and
    a second light source disposed on the fourth side of the second light guide plate, wherein the first light source and the second light source are switched on alternatively.

2. The backlight module as claimed in claim 1, further comprising:
    a first reflector disposed on the second side of the first light guide plate; and
    a second reflector disposed on the third side of the second light guide plate.

3. The backlight module as claimed in claim 2, wherein the first surface of the first light guide plate is opposite to the second light guide plate.

4. The backlight module as claimed in claim 3, further comprising a light absorber disposed adjacent to the first light guide plate.

5. The backlight module as claimed in claim 4, wherein the light absorber is substantially a blackbody.

6. The backlight module as claimed in claim 2, wherein the first surface of the first light guide plate faces the second surface of the second light guide plate.

7. The backlight module as claimed in claim 6, further comprising a third reflector disposed adjacent to the first light guide plate.

8. The backlight module as claimed in claim 1, wherein the micro-groove structure of the first surface and the micro-groove structure of the second surface are the same.

9. The backlight module as claimed in claim 1, wherein the thickness of the first light guide plate is tapered from the first side to the second side, and the thickness of the second light guide plate is tapered from the fourth side to the third side.

10. The backlight module as claimed in claim 1, wherein both the first and second light guide plates have a uniform thickness.

11. The backlight module as claimed in claim 1, wherein the micro-groove structure of the first surface comprises a plurality of micro grooves, and the pitch between two adjacent micro grooves is gradually reduced from the first side to the second side.

12. The backlight module as claimed in claim 1, wherein the micro-groove structure of the second surface comprises a plurality of micro grooves, and the pitch between two adjacent micro grooves is gradually reduced from the fourth side to the third side.

13. The backlight module as claimed in claim 1, wherein a longitudinal center line of the first light guide plate is tilted with respect to a longitudinal center line of the second light guide plate by a predetermined angle.

14. The backlight module as claimed in claim 13, wherein the predetermined angle is substantially smaller than 15 degrees.

15. The backlight module as claimed in claim 1, wherein each micro-structure of the first and second surfaces comprises a plurality of micro grooves, each micro groove has a first plane and a second plane, and an angle formed by the intersection of the first plane and the first or second surface ranges from about 20 to about 60 degrees.

16. The backlight module as claimed in claim 1, further comprising a diffuser disposed on the second light guide plate.

17. The backlight module as claimed in claim 1, wherein the first and second surfaces are formed by diamond knife machining, injection molding, or micro-machinery machining.

18. A display comprising:
    the backlight module of claim 1; and
    a liquid crystal panel disposed on the backlight module.

19. The display as claimed in claim 18, wherein the first light source and the second light source are switched on simultaneously to provide a 2D image.

20. A method for displaying 3D images by a 3D display device comprising a liquid crystal panel and a backlight module, wherein the backlight module comprises a first light source, a second light source, a first light guide plate and a second light guide plate, and the method comprises:
    switching on the first light source and the second light source alternately, wherein the light emitted by the first light source is totally internal reflected by a first surface of the first light guide plate to pass through a second surface of the second light guide plate and the liquid crystal panel to project into one eye, and the light emitted by the second light source is totally internal reflected by the second surface of the second light guide plate to pass through the liquid crystal panel to project into another eye, whereby a 3D image is observed by both eyes.

21. The method as claimed in claim 20, wherein the duration for switching on each of the first light source and the second light source is less than or equal to 0.008 second at a time.

22. A backlight module for a 3D display device, comprising:
   a first light guide plate having a first side, a second side opposite to the first side, a first surface with a micro-groove structure, and a first planar face opposite to the first surface;
   a first light source disposed on the first side of the first light guide plate;
   a second light guide plate, isolated from the first light guide plate and disposed over the first light guide plate, having a third side, a fourth side opposite to the third side, a second surface with a micro-groove structure, and a second planar face opposite to the second surface, wherein the fourth side and the second side are located at the same side, and the first planar face of the first light guide plate faces the second surface of the second light guide plate; and
   a second light source disposed on the fourth side of the second light guide plate.

23. The backlight module as claimed in claim 22, wherein the thickness of the first light guide plate is tapered from the first side to the second side, and the thickness of the second light guide plate is tapered from the fourth side to the third side.

24. The backlight module as claimed in claim 22, wherein the micro-groove structure of the first surface comprises a plurality of micro grooves, and the pitch between two adjacent micro grooves is gradually reduced from the first side to the second side.

25. The backlight module as claimed in claim 22, wherein the micro-groove structure of the second surface comprises a plurality of micro grooves, and the pitch between two adjacent micro grooves is gradually reduced from the fourth side to the third side.

26. The backlight module as claimed in claim 22, wherein each micro-structure of the first and second surfaces comprises a plurality of micro grooves, each micro groove has a first plane and a second plane, and an angle formed by the intersection of the first plane and the first or second surface ranges from about 20 to about 60 degrees.

27. A backlight module for a 3D display device, comprising:
   a first light guide plate having a first side, a second side opposite to the first side, a first surface with a micro-groove structure, and a first planar face opposite to the first surface;
   a first light source disposed on the first side of the first light guide plate;
   a second light guide plate, isolated from the first light guide plate and disposed over the first light guide plate, having a third side, a fourth side opposite to the third side, a second surface with a micro-groove structure, and a second planar face opposite to the second surface, wherein the fourth side and the second side are located at the same side, and the first surface of the first light guide plate faces the second surface of the second light guide plate; and
   a second light source disposed on the fourth side of the second light guide plate.

28. The backlight module as claimed in claim 27, wherein the thickness of the first light guide plate is tapered from the first side to the second side, and the thickness of the second light guide plate is tapered from the fourth side to the third side.

29. The backlight module as claimed in claim 27, wherein the micro-groove structure of the first surface comprises a plurality of micro grooves, and the pitch between two adjacent micro grooves is gradually reduced from the first side to the second side.

30. The backlight module as claimed in claim 27, wherein the micro-groove structure of the second surface comprises a plurality of micro grooves, and the pitch between two adjacent micro grooves is gradually reduced from the fourth side to the third side.

31. The backlight module as claimed in claim 27, wherein each micro-structure of the first and second surfaces comprises a plurality of micro grooves, each micro groove has a first plane and a second plane, and an angle formed by the intersection of the first plane and the first or second surface ranges from about 20 to about 60 degrees.

* * * * *